No. 877,889. PATENTED JAN. 28, 1908.
W. GARDINER.
STORAGE BATTERY.
APPLICATION FILED MA 2, 1905.
4 SHEETS—SHEET 1.
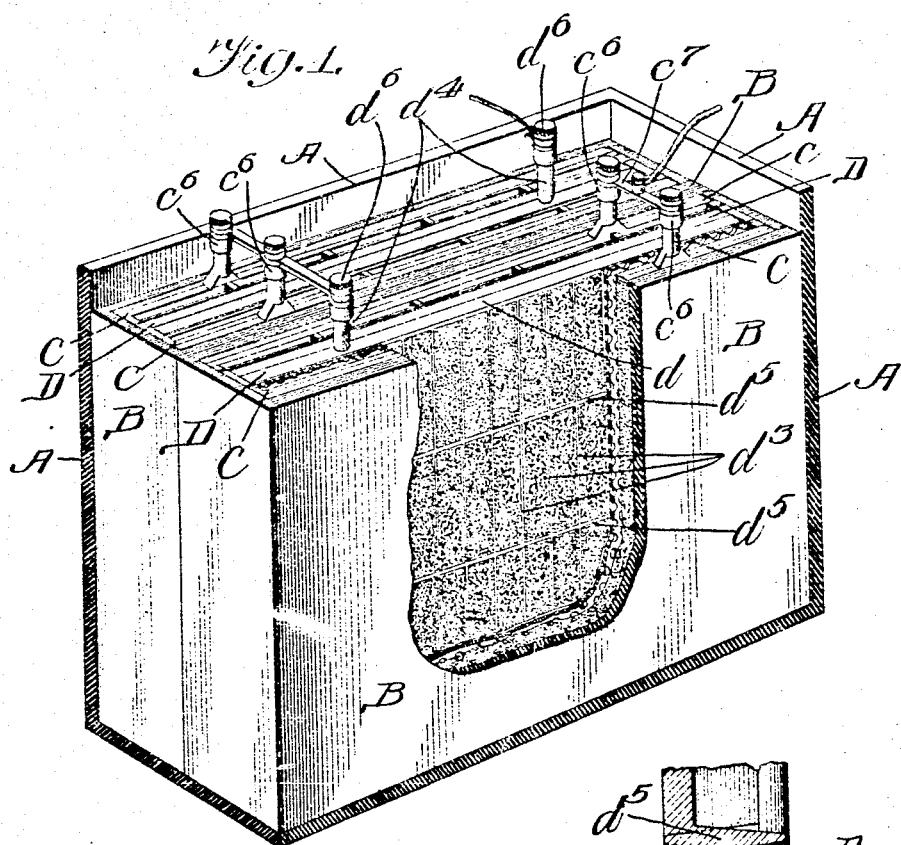
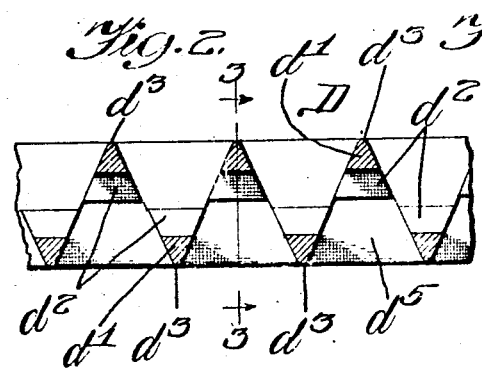
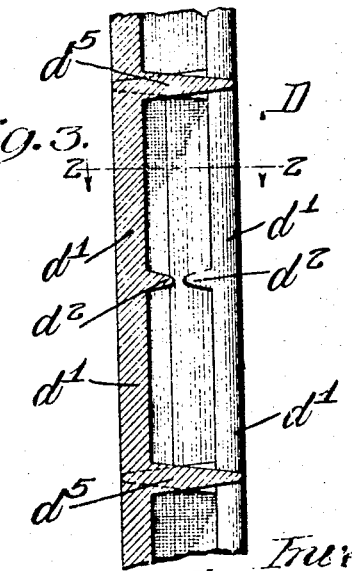
Witnesses:
Inventor:
William Gardiner
By,
Bulkley & Durand
his Attys.

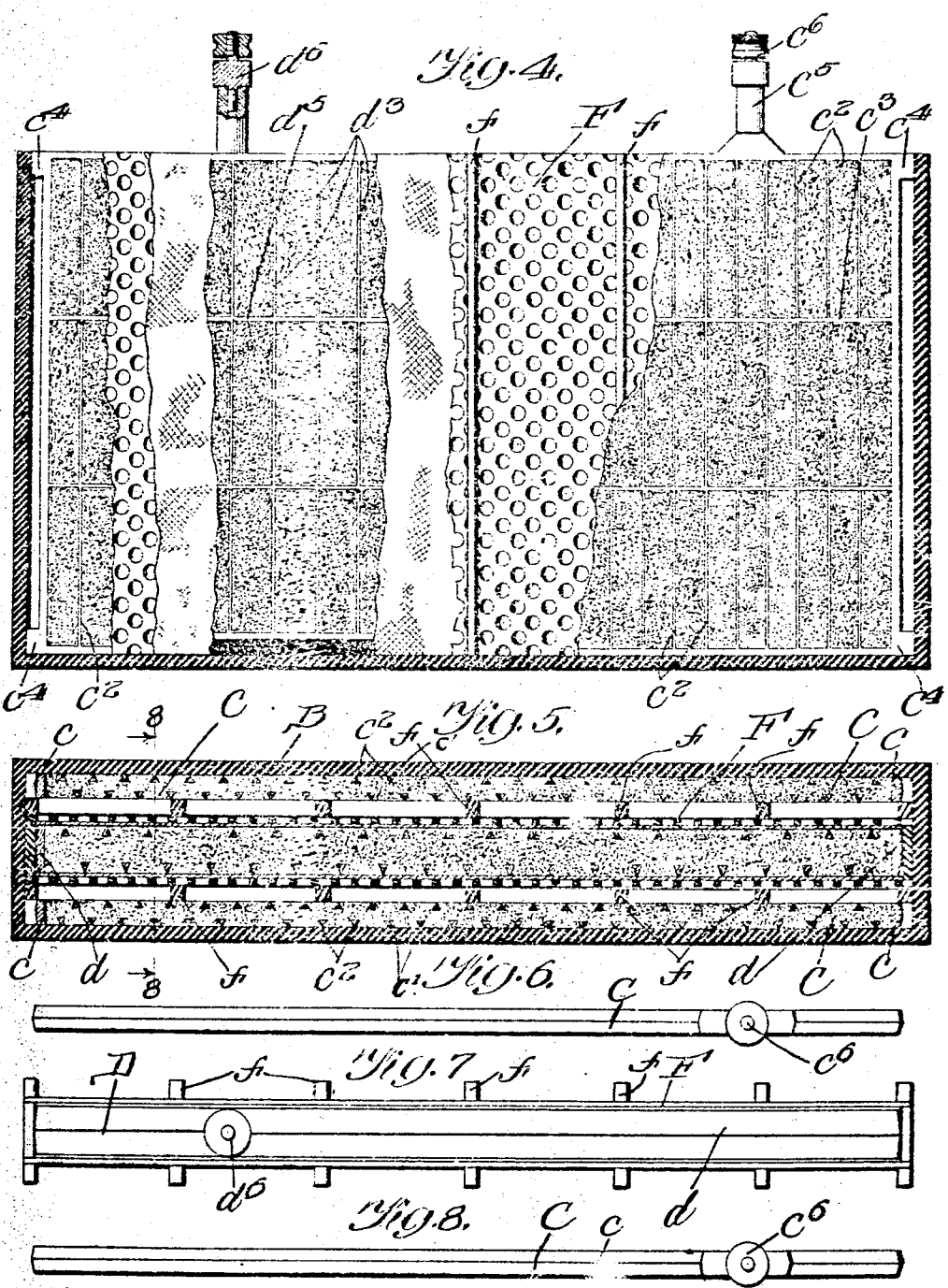

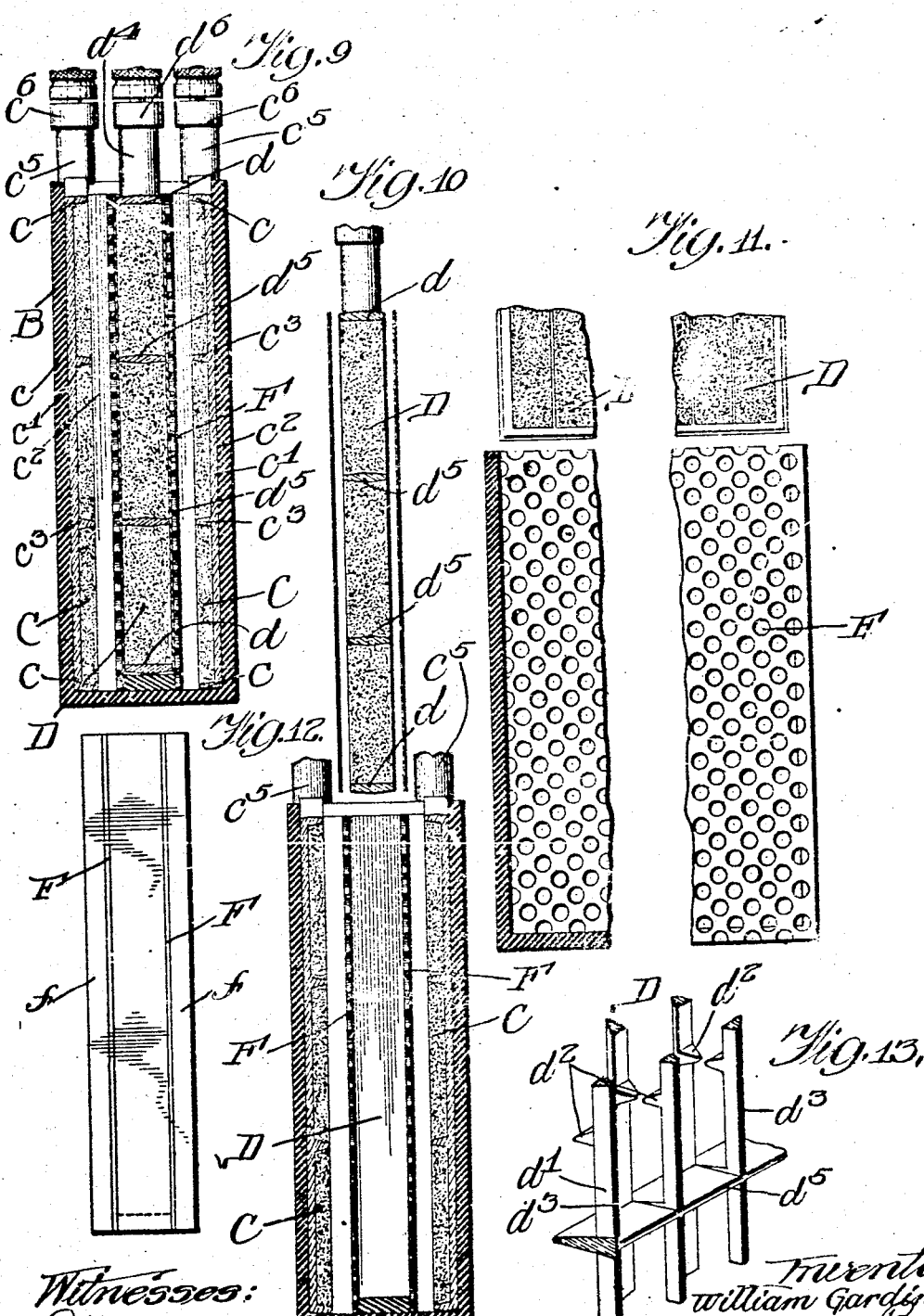

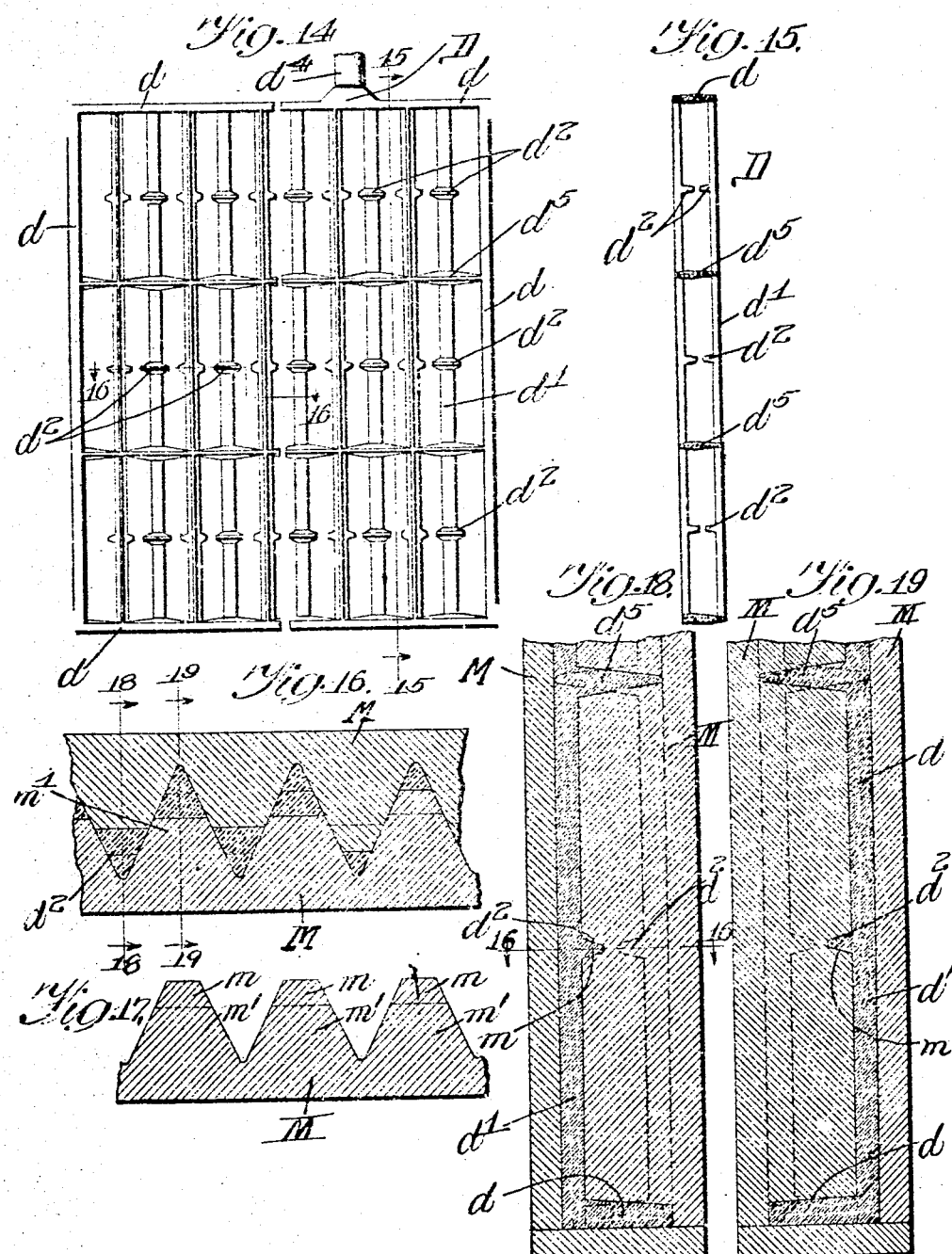

UNITED STATES PATENT OFFICE.

WILLIAM GARDINER, OF CHICAGO, ILLINOIS, ASSIGNOR, BY MESNE ASSIGNMENTS, TO COMMERCIAL STORAGE BATTERY COMPANY, OF CHICAGO, ILLINOIS, A CORPORATION OF ILLINOIS.

STORAGE BATTERY.

No. 877,889.

Specification of Letters Patent.

Patented Jan. 28, 1908.

Application filed May 2, 1905. Serial No. 258,510.

*To all whom it may concern:*

Be it known that I, WILLIAM GARDINER, a citizen of the United States of America, and resident of Chicago, Cook county, Illinois, have invented a certain new and useful Improvement in Storage Batteries, of which the following is a specification.

My invention relates to storage batteries in general, but more particularly to storage batteries of that type in which lead grids or plates are employed, and especially to lead storage batteries in which the material-to-become-active consists of paste, of any suitable or well-known character, applied to the lead grids and then permitted to harden, so that the battery can be charged and discharged, in the usual and well-known manner, without danger of the said material becoming loosened and detached from the lead grids or other metallic supports.

Generally stated, the object of my invention is the provision of an improved, simplified and highly efficient storage battery of the foregoing general character.

Certain special objects of my invention are: The provision of an improved construction of lead grid for the negative plate or electrode,—that is, for the so-called positive-pole-element; to provide an improved construction of grid for the positive plate or electrode,—that is, for the so-called negative-pole-element; to provide an improved construction and arrangement for insuring for said plates or elements a maximum of outer active surface, or surface-to-become-active,—such as the outer surface of the paste which has been applied to the grid and allowed to harden,—and for insuring for the said outer surfaces of the plates or electrodes a minimum of metallic lead surface; to provide an improved construction arrangement involving a divided positive electrode, or negative-pole-element, as it is called, and an inner or intermediate negative electrode, or positive-pole-element, as it is called, and in which the weight and bulk of the said positive electrode or negative-pole-element, although arranged at opposite sides of the negative electrode or positive-pole-element, is no greater than the said inner or intermediate electrode or positive-pole-element, whereby the two electrodes present to each other a full and efficient amount of opposing surface—that is to say, just double the amount of opposing surface which would be obtained by the use of a single positive plate and a single negative plate placed side by side—thus insuring a comparatively high generating power and current strength in a battery of comparatively small bulk and weight; to provide a battery of comparatively small size and weight, but having a generating power and current strength of such character as to make the battery particularly useful and desirable in connection with internal-combustion engines,—that is, for use in supplying the sparker of an engine of this type with the necessary electric current; to provide an improved construction and arrangement for insuring a requisite or proper degree of strength or rigidity in a lead battery involving a comparatively small amount of metallic lead, thus not only reducing the weight of the battery without decreasing its efficiency, or without endangering its strength and rigidity, and at the same time reducing the cost of manufacture of the battery as a whole; to provide an improved construction and formation of grid for insuring a high or requisite degree of conductivity, as well as for insuring against displacement of the paste or material-to-become-active; and to provide certain details and features of improvement, and certain other novel and advantageous features of construction, tending to increase the general efficiency and serviceability of a storage battery of this particular character.

To the foregoing and other useful ends, my invention consists in matters hereinafter set forth and claimed.

In the accompanying drawings, Figure 1 shows a battery involving the principles of my invention, and comprising two cells assembled with two sides of the outer containing-box removed, and showing certain portions broken away to show the side of the positive-pole-element. Fig. 2 shows the method of forming the middle grid and the manner in which the teeth are formed on the inner surfaces of the grid-bars or ribs. Fig. 3 represents a vertical section of said grid upon the line 3—3 of Fig. 2. Fig. 4 is a vertical longitudinal section of the cell, showing certain portions broken away. Fig. 5 shows a horizontal section of the cell. Figs. 6, 7 and 8 are top plan views of the three grids, showing the middle grid inclosed in the pocket or receptacle. Fig. 9 represents a vertical section on the line 8—8 of Fig. 5. Fig. 10 shows a vertical section of the middle or positive-pole-element withdrawn from the cell, and the manner of assembling the porous fiber on either side of this grid, together with the means for insulating the same from the negative-pole-element. Fig. 11 represents a lateral vertical view of the central or positive-pole-element, and illustrates the manner of assembling the same and the perforated insulating material. Fig. 12 is an end view of the pocket or receptacle for inclosing the middle or positive-pole-element. Fig. 13 is a fragmentary perspective view of a portion of the middle grid, showing the inwardly projecting teeth on the inner faces of the grid-bars or ribs. Fig. 14 is a side elevation of the middle grid, with the material-to-become-active removed. Fig. 15 is a vertical section on line 15—15 in Fig. 14. Fig. 16 is a horizontal section of a portion of the mold, showing the manner in which the middle grid is formed, the section being taken on line 16—16 in Fig. 14, or on line 16—16 in Fig. 18. Fig. 17 shows one side of the mold, as shown in Fig. 16, separated from the balance of the structure. Fig. 18 shows a section through the mold, and through one of the grid-bars cast in the mold, and is a section taken on line 18—18 in Fig. 16. Fig. 19 is a section on line 19—19 in Fig. 16.

In Fig. 1, A represents the outer containing-box, in which the desired number of cells, usually two or three, are placed, and which is made of any desirable material. B represents the cell proper, which can be constructed of any of the various materials used for this purpose, such, for example, as hard rubber. C represents the thin plates which, taken together, form the negative-pole-element of the battery. These are preferably constructed of such dimensions that their combined capacity is equal, or substantially equal, to that of the central plate D. The plates C are placed in contact with the inner surface of the cell B.

The plates C and D are each composed of an outer rectangular frame or marginal portion, represented by $c$ and $d$, respectively, $c$ being one-half the width of $d$ in order to make the capacity of the grid represented by D equal to the capacity of the two grids C, one of which latter is placed on each side of D in the cell box B. Within the rectangular frame $c$, and cast integral with it, are parallel vertical bars, or ribs $c^1$, triangular in cross section, with the vertex $c^2$ of the triangle in the plane of the face of the grid. These bars or ribs extend across the face of the grid and join to the frame on the opposite side, and form a series of small parallel ribs for holding within the grid the material-to-become-active.

The bars or ribs are placed alternately on opposite sides of the grid-frame, and are strengthened at various points by horizontal webs $c^3$ running parallel to the horizontal portions of the frame $c$, and transversely to the parallel ribs $c^1$ of the grid, thus binding together all of these ribs at short intervals, and greatly increasing their strength. It will thus be seen that a grid of this form, when filled with material-to-become-active, presents to the solution of the battery a maximum of paste-surface, leaving exposed only the lines or edges $c^2$ of the vertical ribs $c^1$.

The bars or ribs $d^1$ of the plate D are provided, upon their inner faces, with small tooth-like projections $d^2$ which are adapted to more firmly hold the material-to-become-active firmly within the grid. These tooth-like projections are formed by merely causing an incision $m$ to be made in the projecting portions $m^1$ of the complemental parts or halves M of the mold as is shown in Figs. 16 and 17. The outer edges $d^3$ of the ribs $d^1$ are very thin, the ribs being triangular in cross-section. Between the plates C and D are placed perforated sheets F of rubber, or other suitable material, re-inforced at intervals by solid ribs $f$ of suitable dimensions, running vertically, and serving as separating strips to prevent the electrodes from coming in contact with each other. These reticulated separating devices may be, and preferably are, cast in the form of a pocket into which the middle electrode D fits closely, and the pocket being of such a length over all that it will fit closely within the cell-box B.

In order that the plates C may be held firmly within the cell-box, suitable lugs $c^4$ are cast upon each of the corners of the solid frame $c$, making the length of the grid equivalent to the interior length of the cell-box B. On the upper and outer surface of this solid frame $c$, and at a suitable distance from the corners thereof, is cast a suitable cylindrical lug $c^5$, into which is cast a suitable binding post $c^6$. These two binding posts $c^6$ of each cell are bound together with a bar $c^7$, which may be made of brass or any suitable conducting material. A similar lug $d^4$ is cast upon the frame of the grid of the plate D, and in assembling the parts, I find it preferable to arrange the grids so that the lugs of the grids which constitute the negative pole will project from one of the cell-boxes B, while the lug of the positive-pole-grid projects from the cell-box B at the opposite end, as is illustrated in Fig. 1. I prefer, also, in assembling the cells within the cell containing box, to arrange them so that the positive-pole of one cell will lie adjacent to the negative-pole of its neighboring cell—a staggered arrangement in regard to the pole of the assembled cells; by this arrangement the cells are advantageously connected in series. In the plate D, the horizontal webs $d^5$ unite the ribs $d^1$ and give strength to the grid. The plate D has a binding post or terminal $d^8$. As shown, the sheets $d^7$ of cellular or other porous material are interposed between the faces or sides of the plate D and the reticulated side-portions F of the pocket or receptacle. Although shown in several pieces, this pocket or receptacle can be cut or made in one integral piece of rubber or similar material. The pocket thus provided with porous sides keeps the paste or material-to-become-active of the plate D firmly in place. It will be seen that the teeth $d^2$ on one side of the grid are made by the notches or incisions $m$ in the half a section of the mold at the other side of the grid. In other words, each half of the mold makes the teeth at the other side.

From the foregoing, it will be seen that by my invention I provide an exceedingly simple, light and comparatively small, yet highly efficient and powerful storage battery. The lead grids employed insure a requisite or proper degree of stiffness or rigidity, but at the same time give the sides or faces of the plates a maximum of paste-surface,—that is, a maximum of surface-to-become-active, and a minimum of lead or metallic surface, the outer edges of the vertical ribs of each grid being very thin and slight as compared with the width of the masses of paste or material-to-become-active held between them. The layers of cellular or other porous material constitute porous retainers applied to the opposite surfaces of the inner or intermediate electrode, and are held tightly in place against the opposite surfaces of said electrode by the outer perforated or reticulated side walls of the pocket or receptacle in which said electrode is contained. In fact, the said pocket or receptacle provides all of the insulation necessary for properly separating and insulating the electrodes from each other, and provides the means necessary or desirable for holding the paste or material-to-become-active of the inner or intermediate electrode securely in place. Although the two electrodes are substantially the same in weight and bulk, and although flat surfaces are employed, it will be seen that both surfaces of the inner or intermediate electrode are utilized, thus insuring a high degree of efficiency and current-strength in a battery of comparatively small size and little weight. The construction of each grid is effective in retaining the paste or material-to-become-active in place; and in the inner or intermediate electrode or plate the retention of the paste or material-to-become-active in place is still further insured by the provision of the inwardly projecting teeth, as herein explained. The inner or intermediate electrode, together with the means for insulating and separating it from the outer electrode, and for securely retaining its paste or material-to-become-active in place, are removable as a unit from the interior of the battery or cell. Preferably, and as shown and explained, the two sections of the outer electrode are each substantially one-half the thickness of the inner or intermediate electrode; and with the arrangement shown, only the inner surfaces of the said outer electrode are exposed, the outer surfaces thereof being pressed tightly against the side walls of the rubber or other rectangular-shaped cell in which the two electrodes are inclosed. By the arrangement of the ribs of the grids, and by turning the sharp edges or angular faces of the ribs outward, the paste or material-to-become-active is not only more securely held in place—particularly in the case of the grid having the internal teeth—but also the plates are given a comparatively high degree of internal conductivity.

It will be readily understood that the electrolyte employed in my improved battery may be of any known, suitable or approved character, as, for instance, dilute sulfuric acid, or other similar solutions.

What I claim as my invention is

1. A grid comprising an oppositely disposed series of horizontal containing bars, and a series of vertical strengthening bars, said vertical bars being provided with a plurality of inwardly flaring lugs.

2. A grid comprising oppositely disposed series of horizontal, triangular containing bars, and a series of vertical strengthening bars, said vertical bars being provided with a plurality of inwardly flaring lugs.

3. A grid comprising oppositely disposed series of horizontal, triangular containing bars set with apex outward, and a series of vertical strengthening bars, said vertical bars being provided with a plurality of inwardly flaring lugs.

4. A grid comprising oppositely disposed series of horizontal containing bars of a triangular cross-section, and a series of oppositely disposed vertical strengthening bars, each bar being provided with a series of inwardly flaring lugs or teeth, the teeth of oppositely disposed bars being in staggered relation to each other.

5. A grid comprising oppositely disposed series of horizontal containing bars of a triangular cross-section set with apex outward, and a series of oppositely disposed vertical strengthening bars, each bar being provided with a series of inwardly flaring lugs or teeth, the teeth of oppositely disposed bars being in staggered relation to each other.

6. A storage battery plate comprising a lead grid having vertically disposed ribs provided with inwardly projecting teeth or lugs, and material-to-become-active filling the spaces or recesses between said ribs and held in place therein by the said teeth or lugs.

Signed by me at Chicago, Cook county, Illinois, this 20th day of April 1905.

WILLIAM GARDINER.

Witnesses:
SARAH LEWIS,
ALBERT J. SAUSER